United States Patent
Taguchi et al.

(10) Patent No.: US 7,488,906 B2
(45) Date of Patent: Feb. 10, 2009

(54) STEERING SWITCH DEVICE

(75) Inventors: Kiyotaka Taguchi, Kariya (JP); Masaru Sawaki, Niwa-gun (JP); Tetsuya Enokizaka, Nagoya (JP); Tsuneo Uchida, Okazaki (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 11/521,406

(22) Filed: Sep. 15, 2006

(65) Prior Publication Data

US 2007/0068336 A1    Mar. 29, 2007

(30) Foreign Application Priority Data

Sep. 16, 2005   (JP)   ............................. 2005-270230
May 31, 2006   (JP)   ............................. 2006-151658

(51) Int. Cl.
  *H01H 9/26*   (2006.01)
(52) U.S. Cl. ...................................... 200/5 R; 200/5 A
(58) Field of Classification Search ................ 200/5 R, 200/5 A, 61.54–61.57
  See application file for complete search history.

(56) References Cited

U.S. PATENT DOCUMENTS

| | | | | |
|---|---|---|---|---|
| 6,852,936 B2 * | 2/2005 | Hayashi et al. | .......... | 200/61.54 |
| 2003/0023353 A1 * | 1/2003 | Badarneh | ........................ | 701/1 |
| 2003/0094354 A1 | 5/2003 | Badarneh | | |
| 2005/0011736 A1 * | 1/2005 | Mori et al. | ................... | 200/5 R |
| 2005/0077157 A1 * | 4/2005 | Sasanouchi et al. | ........ | 200/38 A |
| 2005/0167252 A1 * | 8/2005 | Inoue et al. | .............. | 200/61.54 |
| 2005/0179532 A1 * | 8/2005 | Nagai et al. | .................. | 340/461 |
| 2006/0293807 A1 * | 12/2006 | Okuyama | ..................... | 701/21 |
| 2007/0051592 A1 * | 3/2007 | Hyum et al. | ................. | 200/5 R |
| 2007/0089977 A1 * | 4/2007 | Hirobe et al. | ............... | 200/512 |

FOREIGN PATENT DOCUMENTS

| | | |
|---|---|---|
| DE | 199 47 506 A1 | 4/2001 |
| JP | B2-01-043645 | 9/1989 |
| JP | A-10-334771 | 12/1998 |
| JP | A-2000-100272 | 4/2000 |
| JP | A-2002-091694 | 3/2002 |
| JP | A-2003-063326 | 3/2003 |

* cited by examiner

*Primary Examiner*—Michael A Friedhofer
*Assistant Examiner*—Lisa N Klaus
(74) *Attorney, Agent, or Firm*—Posz Law Group, PLC

(57) ABSTRACT

A steering switch device has an operation member to be operated on a steering wheel of a vehicle. An operation condition of the operation member is controlled by a control unit when the steering wheel is rotated. The operation member is for example a cylindrical member and disposed operable in a rotation manner. When the steering switch is rotated, a rotating operation of the cylindrical operation member is restricted by the control unit. Alternatively, the rotating operation of the operation member is controlled to be loaded. In a case that the operation member is a button member for indicating a direction, a pressing operation of the button member is controlled so as not to be pressed or to be loaded by the control unit when the steering wheel is rotated.

16 Claims, 8 Drawing Sheets

STEERING SWITCH DEVICE

CROSS REFERENCE TO RELATED APPLICATION

This application is based on Japanese Patent Application No. 2005-270230 filed on Sep. 16, 2005 and No. 2006-151658 filed on May 31, 2006, the disclosure of which are incorporated herein by reference.

FIELD OF THE INVENTION

The present invention relates to a steering switch device mounted to a steering wheel of a vehicle.

BACKGROUND OF THE INVENTION

A switch device having a jog dial is known as a switch device. The jog dial is generally a cylindrical operation member and is mounted to be rotationally operated. The jog dial can be used to indicate directions, e.g., used as an up cursor key or a down cursor key, hence is considerably excellent in operability. The switch device having the jog dial is for example disclosed in Japanese Publication No. 2002-91694.

For example, it is considered to mount such a jog dial to a steering wheel of a vehicle as an input device or an operation device for a car navigation system. In this case, a display of the navigation system is for example arranged close to a speed meter within an instrument panel. In this construction, the jog dial is arranged such that a rotation axis extends horizontally. When the jog dial is rotationally moved in the upward direction, the jog dial is used as the up cursor key. When the jog dial is rotationally moved in the downward direction, the jog dial is used as the down cursor key.

For example, when plural selecting items are listed in the vertical direction in the display, an item of the plural selecting items can be selected by rotationally moving and operating the jog dial in the upward direction or the downward direction. As such, the selecting items can be easily selected.

However, when a user (driver) rotates the steering wheel, an operation direction of the jog dial is inclined relative to the vertical direction, i.e., the arrangement direction of the selecting items. Accordingly, the driver is likely to feel physical disorder to select the item from the plural selecting items, which are vertically arranged. In particular, when the steering wheel is rotated 90 degrees or more from a basic position, the operating direction of the jog dial is largely inclined or opposed relative to the vertical direction. Therefore, the driver is likely to feel physical disorder, and operability of the jog dial reduces.

SUMMARY OF THE INVENTION

According to a first aspect of the present invention, a steering switch device for a vehicle has an operation member and a control unit. The operation member has a cylindrical shape and is disposed to be rotationally operated on the steering wheel. The control unit controls a rotating movement of the operation member when the steering wheel is rotated.

For example, the control unit has a mechanism that restricts the rotating movement of the operation member when the steering wheel is rotated. Alternatively, the control unit can have a mechanism that applies a load on the operation member such that resistance to the rotating movement of the operation member is increased when the steering wheel is rotated.

Accordingly, when the steering wheel is rotated, the rotating operation of the operation member is controlled to be restricted or to be loaded. As such, it is less likely that a user will feel physical disorder to rotationally operate the operation member on the steering wheel that is rotated from its base position. With this, operability of the operation member will not be reduced.

According to a second aspect of the present invention, the operation member has an operation member disposed to be operated in a pressing manner for providing a directional instruction. In this case, a pressing operation of the operation member is restricted by the control unit when the steering wheel is rotated. Alternatively, the operation member is controlled to be loaded with respect to the pressing operation so that it is difficult to press the operation member when the steering wheel is rotated.

Accordingly, when the steering wheel is rotated, the pressing operation of the operation member is controlled to be restricted or to be loaded. As such, it is less likely that a user will feel physical disorder to operate the operation member to indicate a direction on the steering wheel that is rotated from its base position. With this, operability of the operation member will not be reduced.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EXAMPLE EMBODIMENT

First Example Embodiment

Figure 1:
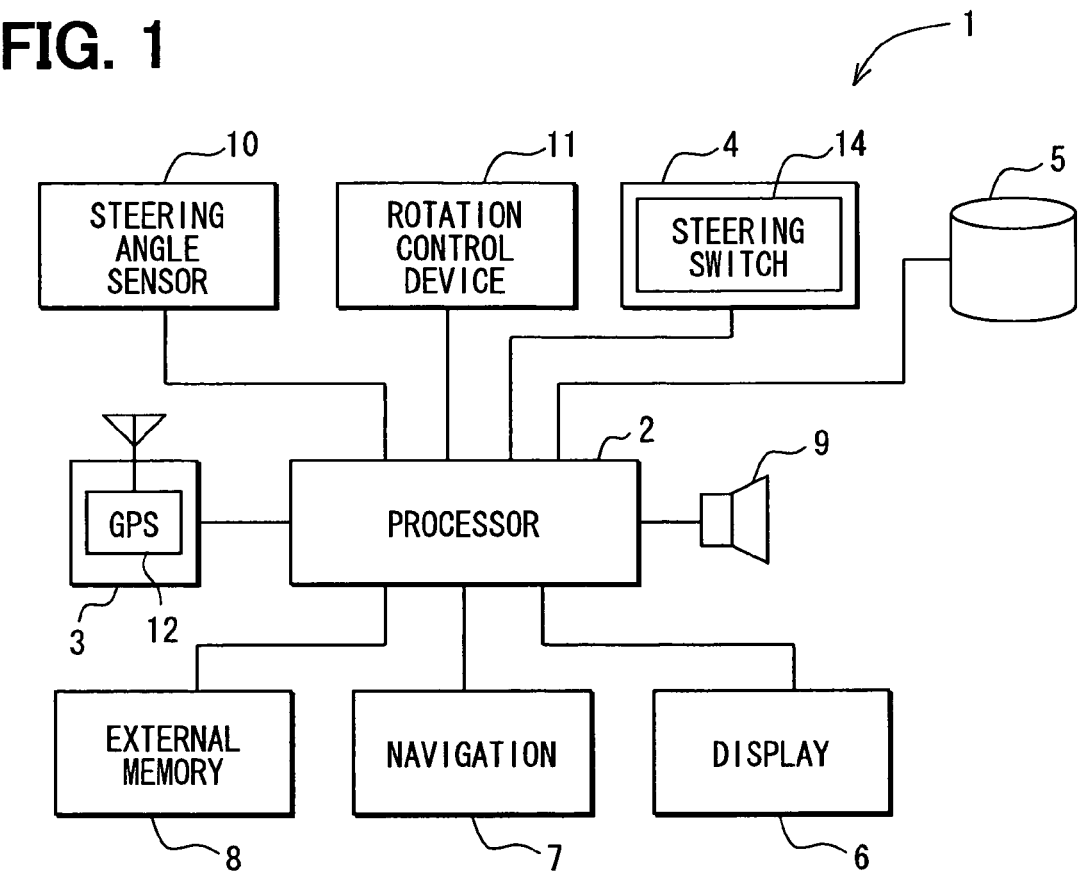
FIG. 1 is a schematic block diagram of a car navigation system according to a first example embodiment of the present invention.

A first example embodiment of a steering switch device of the present invention will now be described with reference to FIGS. 1 to 7. As shown in FIG. 1, a steering switch device 14 is for example employed as an operation device to operate a car navigation system 1. The car navigation system 1 is constructed of an information processor 2, a position detector 3, an operating switch group 4, a map data input device 5, a display device 6, a navigation device 7, an external memory device 8, a speaker 9, a steering angle sensor 10 and a rotation control device 11.

The information processor 2 controls overall operations of the car navigation system 1. Although not illustrated, the information processor 2 is constructed of a CPU, a ROM, a RAM, I/O and a bus for connecting these members.

The position detector 3 is constructed of a GPS (Global Positioning System) receiver 12, a gyroscope (not shown), a vehicle speed sensor (not shown) and the like. The position detector 3 detects the present position of a vehicle with high accuracy while mutual interpolation is performed by the above respective sensors.

Figure 2:
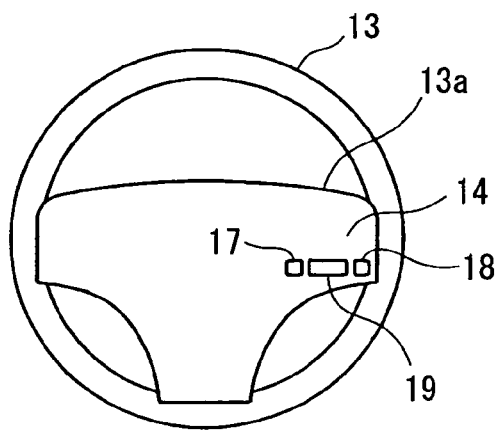
FIG. 2 is a front view of a steering wheel having a steering switch device according to the first example embodiment.

The operating switch group 4 is constructed of a steering switch device 14, mechanical push switches (not shown), a remote controller (not shown) and the like. As shown in FIG. 2, the steering switch device 14 is mounted to a steering wheel 13 of the vehicle. The push switches are located in an operation panel that is generally arranged in an appropriate part of an instrument panel of the vehicle. A construction of the steering switch device 14 will be described later in detail.

The map date input device 5 is a device for inputting map data and the like. The map data input device 5 is constructed of a reader capable of reading a CD-ROM, a DVD-ROM, an HDD, a memory and the like.

The display device 6 is for example constructed of a color liquid crystal display for displaying a map. Further, the display device 6 is constructed such that additional data such as a self vehicle position mark and a guide path is displayed and overlapped on a map data (road data, character data, background data, etc.).

Figure 3:
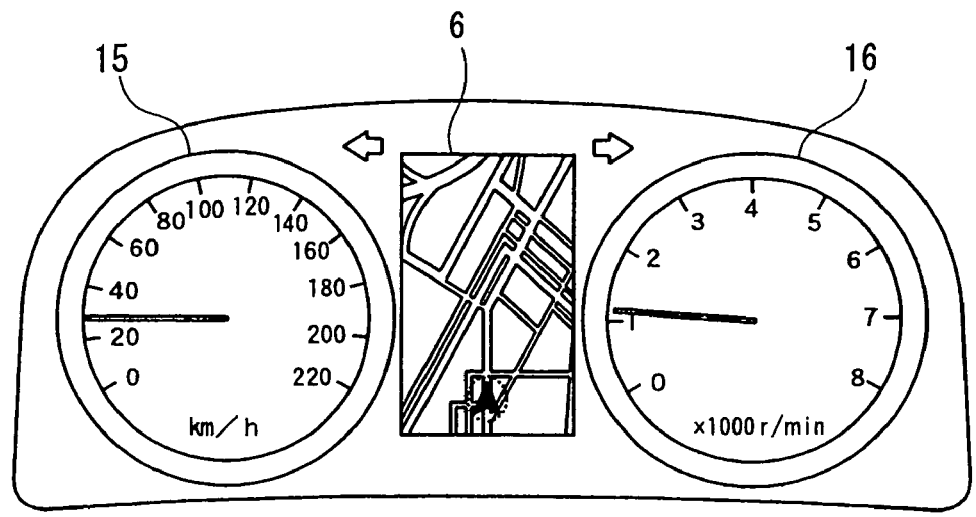
FIG. 3 is a front view of a meter device having a display section associated with the steering switch device according to the first example embodiment.

For example, the display device 6 is arranged in a meter device mounted on the instrument panel of the vehicle, between a speed meter 15 and a tachometer 16 of the meter device, as shown in FIG. 3. The speaker 9 outputs various kinds of messages for voice guides, operation sounds, music, and the like.

The navigation device 7 has a function (e.g., path calculating function) for automatically calculating and setting an optimum path (guide path) from the present position (departure place) to a destination place. For example, Dijkstra's algorithm and the like are used as a method for automatically setting the optimum path. The destination place can be set by user's operation through the operating switch group 4.

Also, the navigation device 7 has further various functions. For example, the navigation device 7 has a function for displaying the optimum path (guide path) to the destination place on a map displayed in the display device 6, and a function for executing map matching processing for locating the present position on the above map.

The external memory device 8 is a device for inputting various data such as map data, music data, and screen image data. The external memory device 8 is constructed of a reader such as a memory stick, a memory card, and a magnetic tape.

Further, the steering angle sensor 10 is a sensor for detecting a rotating operation angle (rotating amount) of the steering wheel 13. The steering angle sensor 10 outputs a signal regarding the detected angle to the information processor 2.

Although not illustrated, the information processor 2 is connected to various kinds of controllers mounted on the vehicle. The information processor 2 is constructed so as to transmit and receive data to and from the above controllers. Further, the information processor 2 is constructed so as to transmit and receive data to and from external information supply centers such as a VICS center and various information centers through a communication device (not shown) such as a VICS communication device and a portable telephone (e.g., a dedicated portable telephone terminal, a general purpose portable telephone set).

Next, the steering switch device 14 will be described with reference to FIGS. 2 and 4. As shown in FIG. 2, the steering switch device 14 is for example arranged in a spoke portion 13a of the steering wheel 13. For example, the steering switch device 14 is constructed of two push button switches 17, 18, and a jog dial switch 19 arranged between the two push button switches 17, 18. The left-hand push button switch 17, which is located on the left of the jog dial switch 19, is used as a left cursor key. The right-hand push button switch 18, which is located on the right of the jog dial switch 19 is used as a right cursor key. The jog dial switch 19 serves as an operation member in this embodiment.

Figure 4:
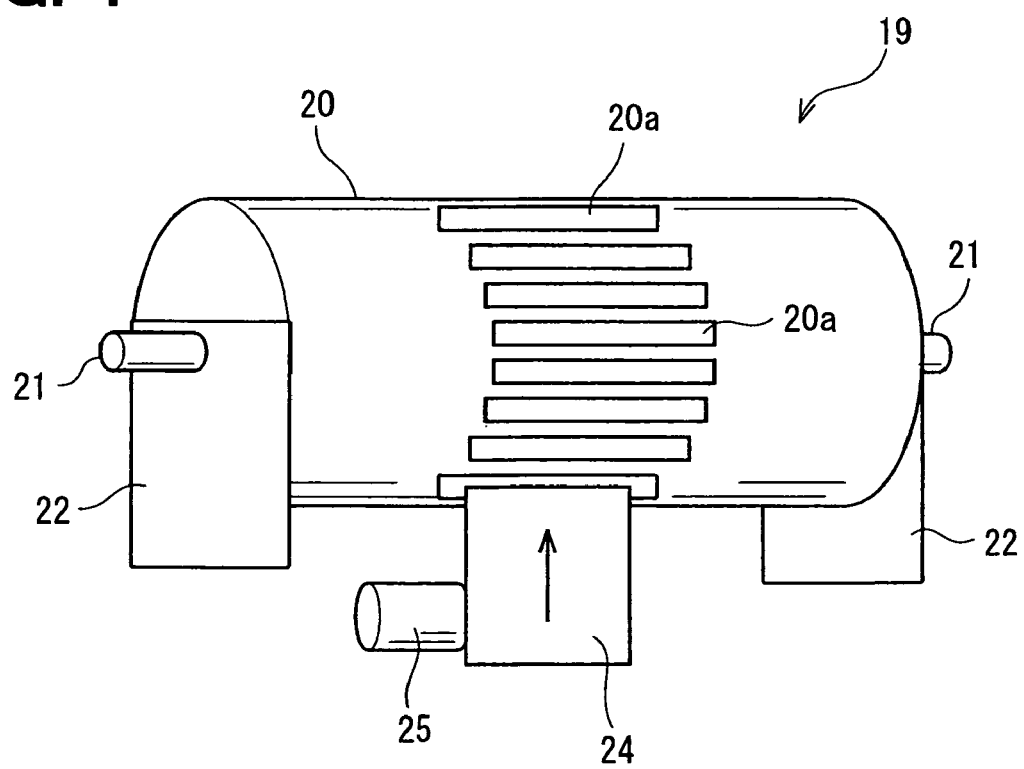
FIG. 4 is a schematic perspective view of a jog dial member and a rotation control device of the steering switch device according to the first example embodiment.

As shown in FIG. 4, the jog dial switch 19 is constructed of a jog dial member 20, a rotation sensor (not shown) and a micro switch (not shown). The jog dial member 20 has a columnar or cylindrical shape. The jog dial member 20 is operable on the steering wheel 13. For example, the jog dial member 20 is arranged to be rotated and pressed with respect to the steering wheel 13. The rotation sensor detects a rotating direction and a rotating amount (rotating angle) of the jog dial member 20. The micro switch is turned on when the jog dial member 20 is pressed down.

The jog dial member 20 is arranged such that its rotation axis extends in a horizontal direction in a condition that the steering wheel 13 is located in a basic or original position shown in FIG. 2. When the jog dial member 20 is rotated in an upward direction, the jog dial 20 is used as an up cursor key. When the jog dial member 20 is rotated in a downward direction, the jog dial member 20 is used as a down cursor key.

Figure 5:
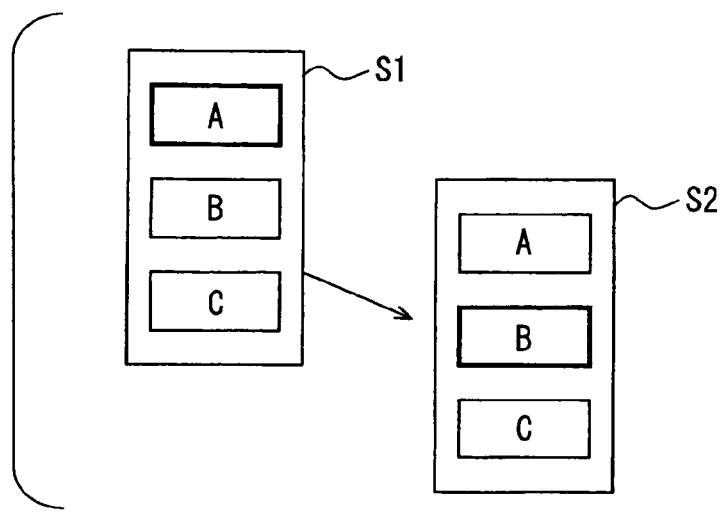
FIG. 5 is an explanatory view of a screen of the display section of the meter device for explaining a change of display image according to the first example embodiment.

For example, as shown in FIG. 5, when plural (e.g., three) selecting items are displayed and listed in the vertical direction in the display device 6, one of or plural selecting items can be selected by rotationally operating the jog dial member 20 in the upward direction or the downward direction. For example, in a condition that a selecting item A is selected as shown in a screen S1, when the jog dial member 20 is rotated in the downward direction, a selecting item B that is located under the item A is selected as shown in a screen S2.

Figure 6:
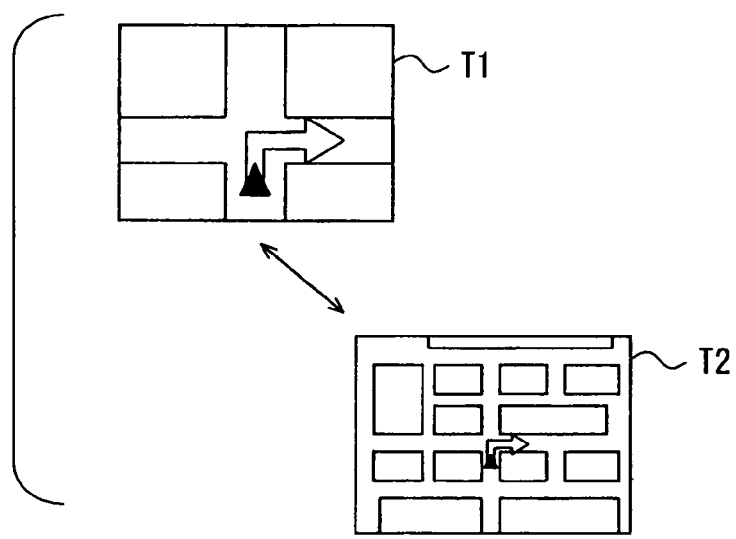
FIG. 6 is an explanatory view of a screen of the display section for explaining a change of another display image according to the first example embodiment.

Further, as shown in FIG. 6, when a map is displayed in the display device 6, a scale of the map can be changed by rotationally operating the jog dial member 20 in the upward direction or the downward direction. For example, the map can be changed between images T1 and T2, as shown in FIG. 6.

As shown in FIG. 4, the jog dial member 20 has two rotation shafts 21 extending from the central portions of axial end faces of the cylindrical portion. The rotation shafts 21 are supported through support members 22 such that the jog dial member 20 is rotatably supported.

Further, the jog dial switch 19 is provided with the rotation control device 11, which is also referred to herein as a control unit, for controlling the rotating movement of the jog dial 20. The rotation control device 11 is constructed of plural grooves 20a, a plate 24 and a motor 25. The grooves 20a are formed on an outer circumferential surface of the jog dial member 20. The plate 24 is arranged to be movable with respect to the jog dial member 20 so that its end can be received in one of the grooves 20a. The plate 24 is operated by the motor 25. An electric supply to the motor 25 is controlled by the information processor 2. In this case, the rotation control device 11 serves as a locking mechanism for mechanically locking the jog dial member 20 to prevent rotation.

The plate 24 is moved toward the jog dial member 20 (in the upward direction in FIG. 4) by rotationally moving the motor 25 in one direction. When the end of the plate 24 is received in one of the grooves 20a of the jog dial member 20, the rotating movement of the jog dial member 20 is locked. On the contrary, the plate 24 is moved in a direction separating from the jog dial member 20 (in the downward direction in FIG. 4) by rotationally moving the motor 25 in the opposite direction. When the end of the plate 24 is separated from the groove 20a by moving the plate 24 in the opposite direction, the locking of the jog dial member 20 is released. Thus, the jog dial member 20 is in a condition that its rotating operation is permitted.

Figure 7:
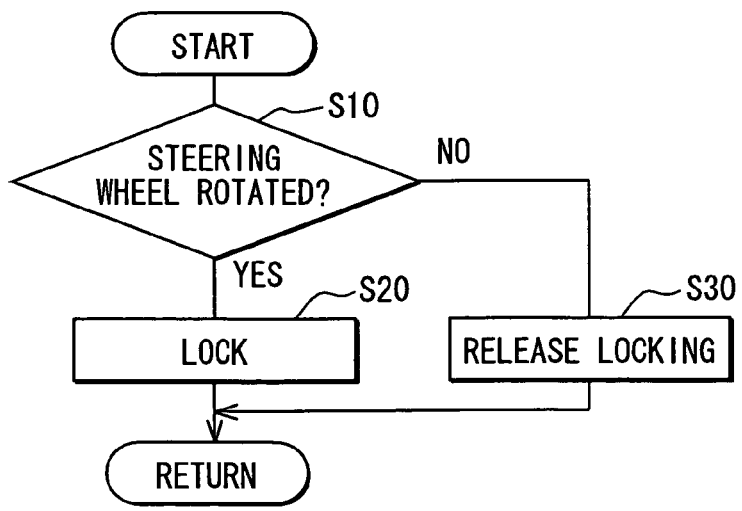
FIG. 7 is a flow chart for showing a control operation with respect to the steering switch device according to the first example embodiment.

Next, an operation of the rotation control device 11 when the steering wheel 13 is operated i.e., rotated will be described with reference to FIG. 7. The flow chart shown in FIG. 7 shows a part of a control operation of the information processor 2. Namely, the flow chart shows a control operation executed for controlling the rotating operation of the jog dial member 20.

First, in step S10, it is determined whether or not the steering wheel 13 is rotated from the basic position. When it is determined that the steering wheel 13 is rotated, the processing proceeds to step S20. In the step S20, processing for restricting the rotating operation of the jog dial member 20, i.e., processing for locking the jog dial member 20 is executed.

Namely, the plate 24 is moved toward the jog dial member 20 such that the end of the plate 24 is fitted to one of the grooves 20a of the jog dial member 20 by rotating the motor 25 in one direction. Thus, the rotating movement of the jog dial member 20 is mechanically restricted. This processing is skipped when the rotating movement of the jog dial member 20 is already restricted.

On the other hand, when it is determined that the steering wheel 13 is not rotated, the processing proceeds to step S30. In the step S30, processing for releasing the locking of the rotating movement of the jog dial member 20 is executed.

Namely, the plate 24 is moved in the opposite direction such that the end of the plate 24 is separated from the groove 20a of the jog dial member 20 by rotating the motor 25 in the opposite direction. Thus, the jog dial member 20 is in a condition that its rotating operation is permitted. This processing is skipped when the locking of the rotating movement of the jog dial member 20 is already released.

Accordingly, when the steering wheel 13 is rotated, the rotating movement of the jog dial member 20 is restricted. Namely, in a condition that the steering wheel 13 is rotated from the basic position, the jog dial member 20 is locked such that the rotating operation can not be performed. As such, it is less likely that the user will feel physical disorder in operating the jog dial member 20 in a direction inclined from a reference direction (e.g., an arrangement direction of the selecting items) of the display device 6 due to the rotation of the steering wheel 13. Also, it is less likely that operability of the jog dial member 20 due to the rotation of the steering wheel 13 will be reduced.

Further, the rotation control device 11 is constructed of the locking mechanism for mechanically locking the rotating movement of the jog dial member 20. Accordingly, the rotating movement of the jog dial 20 can be reliably restricted.

In determination of the rotating operation angle of the steering wheel 13, a rotating operation angle in a range of free play of the steering wheel 13 is allowed. Namely, when the rotating operation angle of the steering wheel 13 is in the range of free play, it is determined that the steering wheel 13 is not rotated.

In the above, the jog dial member 20 is constructed to be operated in a rotational manner and a pressing manner with respect to the steering wheel 13, and the rotating operation of the jog dial member 20 is not available, i.e., the rotating operation of the jog dial member 20 is restricted when the steering wheel 13 is rotated. In this case, it can be constructed such that the pressing operation of the jog dial member 20 is available, i.e., the jog dial member 20 can be pressed while the rotating movement of the jog dial member 20 is restricted when the steering wheel 13 is rotated.

As a construction capable of allowing the pressing operation of the jog dial member 20, it is constructed such that the rotation control device 11 is entirely movable with the pushing movement of the jog dial member 20 when the jog dial member 20 is pressed, but may be also constructed by another way.

Alternatively, the jog dial member 20 can be constructed such that the pressing operation is not available, i.e., restricted when the steering wheel 13 is rotated. In this case, a pressing operation restricting device for restricting the pressing operation of the jog dial member 20 may be suitably arranged (e.g., see FIG. 16 of a sixth example embodiment described later).

Further, it can be constructed such that whether or not the pressing operation of the jog dial member 20 when the steering wheel 13 is rotated is available is selected and set by the user.

Figure 8:
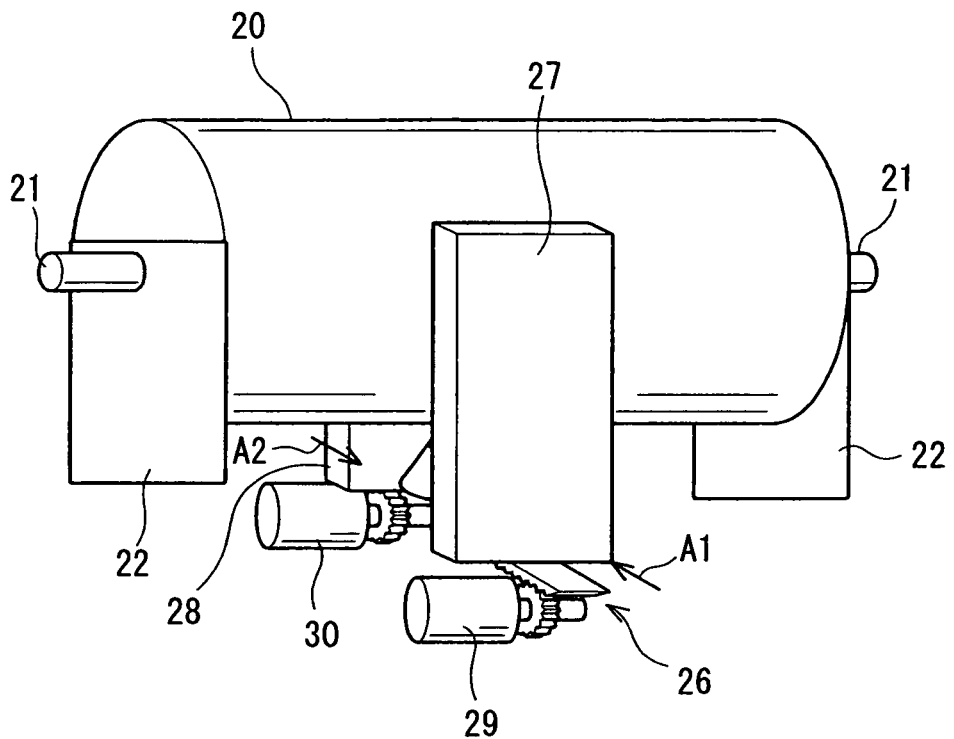
FIG. 8 is a schematic perspective view of a jog dial member and a rotation control device of a steering switch device according to a second example embodiment of the present invention.

Next, a second example embodiment of the present invention will be described with reference to FIG. 8. Structural parts similar to those of the first example embodiment are designated by the like reference numerals, and descriptions will not be repeated.

In the second example embodiment, the rotating movement of the jog dial member 20 is restricted by a rotation control device 26, or control unit, having a brake mechanism that restricts the rotating movement of the jog dial member 20 by a frictional force.

For example, the rotation control device 26 is constructed of two frictional plate members 27, 28 for sandwiching the jog dial member 20 and motors 29, 30 for operating the frictional plate members 27, 28. The frictional plate members 27, 28 are arranged on radially opposite sides of the jog dial member 20 and reciprocated by the motors 28, 29, in directions approaching and separating from the jog dial member 20.

Specifically, the frictional plate member 27 is operated by the motor 29 in the direction of arrow A1 through a gear portion provided at an end of the plate member 27. Likewise, the frictional plate member 28 is operated by the motor 30 in the direction of arrow A2 through a gear portion provided at an end of the plate member 28. As such, the jog dial member 20 is pinched by the two frictional plate members 27, 28, to thereby restrict the rotating movement of the jog dial member 20 by applying the frictional force. To release the restriction of the rotating movement of the jog dial member 20, the frictional plate member 27 is operated by the motor 29 in the direction opposite to the direction of arrow A1, and the frictional plate member 28 is operated by the motor 30 in the direction opposite to the direction of arrow A2.

Structures of the second example embodiment except for the rotation control device 26 are the same as the structures of the first example embodiment. Accordingly, advantageous effects similar to those of the first example embodiment can be provided also in the second example embodiment.

In the second example embodiment, the rotating movement of the jog dial member 20 is restricted by pinching the jog dial member 20 by the two frictional plate members 27, 28. Alternatively, as a modification of the second example embodiment, the rotating movement of the jog dial member 20 can be regulated by adjusting the frictional force applied to the jog dial member 20. Here, the frictional force can be controlled by adjusting the force applied to the jog dial member 20 by the two frictional plate members 27, 28. Namely, the jog dial member 20 is loaded by increasing resistance to the rotating movement of the jog dial member 20 so that it is difficult to rotate the jog dial member 20.

In this case, the rotation control device 26 constitutes a rotating movement resistance applying device for applying a resistance with respect to the rotating movement of the jog dial member 20. Namely, the resistance applying device is constructed by a brake mechanism for increasing the resistance to the rotating movement of the jog dial member 20 by the frictional force.

Accordingly, in the modification of the second example embodiment, it is constructed such that the jog dial member 20 is loaded with respect to the rotating operation when the steering wheel 13 is rotated. Hence, it is difficult to simply rotate the jog dial member 20 in a condition that the steering wheel 13 is rotated from the basic position. Therefore, it is less likely that the user will feel physical disorder to rotate the jog dial member 20 in the condition that the steering wheel 13 is rotated.

Figure 9:
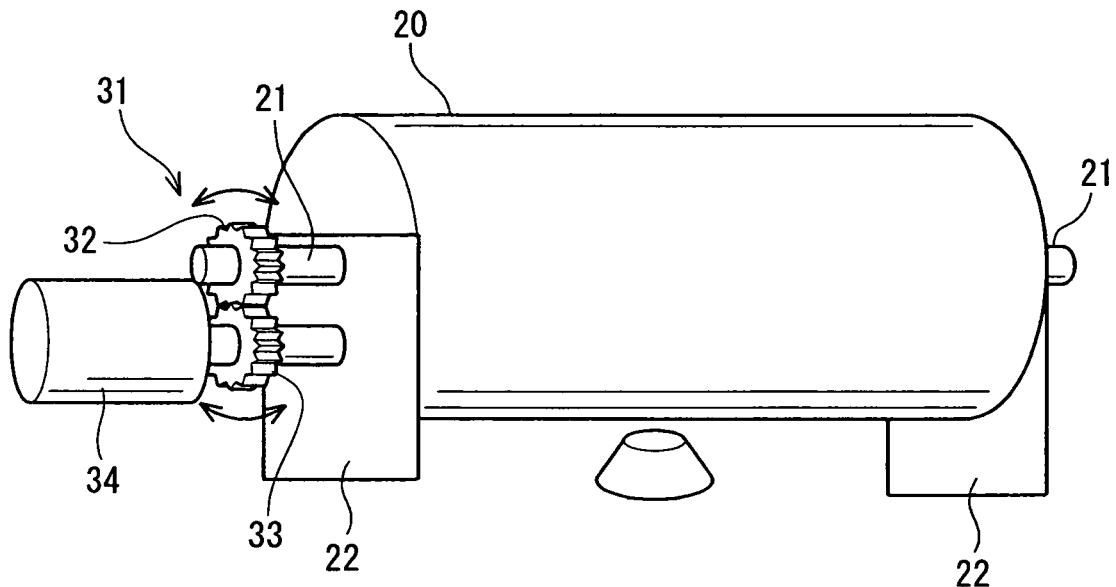
FIG. 9 is a schematic perspective view of a jog dial member and a rotation control device of a steering switch device according to a third example embodiment of the present invention.

Next, a third example embodiment of the present invention will be described with reference to FIG. 9. Structural parts similar to those of the first example embodiment are designated by the like reference numerals, and descriptions will not be repeated.

In the third example embodiment, a rotation control device 31, or control unit, is constructed by a repulsion force applying mechanism for restricting the rotating movement of the jog dial member 20 by applying a repulsion force.

For example, the rotation control device 31 is constructed of a motor 34 for applying the repulsion force of the rotating movement of the jog dial member 20 to the jog dial member 20 through gears 32, 33. The electric power supply to the motor 34 is controlled such that a force (repulsive force) is generated in a direction opposite to the rotating direction of the jog dial member 20, thereby to restrict the rotating operation of the jog dial member 20.

Also, it is constructed such that the-motor 34 can freely rotate when the motor 34 is not supplied with the electric power. As such, to release the restriction of the rotating movement of the jog dial member 20, the electric power supply to the motor 27 is interrupted so that the motor 27 freely rotates.

Structures of the third example embodiment except for the rotation control device 31 are the same as the structures of the first example embodiment. Accordingly, advantageous effects similar to those of the first example embodiment can be also provided in the third example embodiment.

In the third example embodiment, the rotating movement of the jog dial member 20 is restricted by applying the force to the jog dial member 20 in the direction opposite to the direction of the rotating operation of the jog dial member 20 by the motor 34. Alternatively, the rotating movement of the jog dial member 20 can be loaded so that it is difficult to rotate the jog dial member 20, as a modification of the third example embodiment. Namely, the magnitude of the rotating movement resistance of the jog dial 20 is adjusted by adjusting the magnitude of the repulsive force applied to the jog dial 20 by the motor 34. Thus, the rotating operation feeling of the jog dial member 20 is heavy. In other words, the user feels heavy to rotate the jog dial member 20.

In this case, the rotation control device 31 constitutes a rotating movement resistance applying device (repulsive force applying mechanism). Namely, the resistance applying device is constructed by the repulsive force applying mechanism for increasing the rotating movement resistance of the jog dial 20 by applying the force (repulsive force) to the jog dial member 20 in the direction opposite to the rotating movement direction of the jog dial member 20.

Accordingly, in the modification of the third example embodiment, it is constructed such that the rotating movement of the jog dial member 20 is loaded in a condition that the steering wheel 13 is rotated from the basic position. Similar to the modification of the second example embodiment, it is difficult to easily rotationally operate the jog dial member 20 when the steering wheel 13 is rotated. As such, it is less likely that the user will feel physical disorder to operate the jog dial member 20 on the rotated steering wheel 13.

Figure 10:
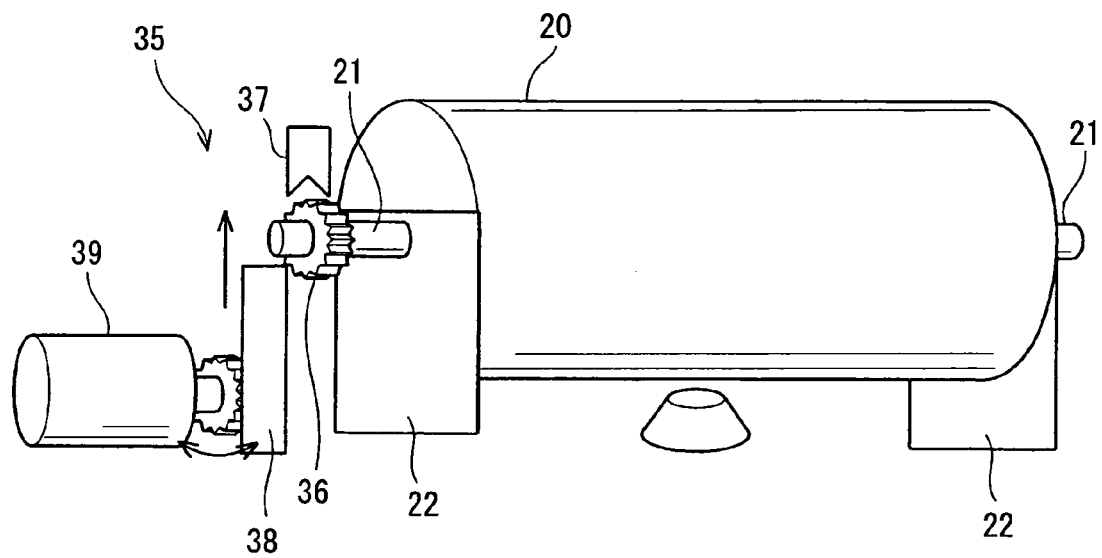
FIG. 10 is a schematic perspective view of a jog dial member and a rotation control device of a steering switch device according to a fourth example embodiment of the present invention.

Next, a fourth example embodiment of the present invention will be described with reference to FIG. 10. Structural parts similar to those of the first example embodiment are designated by the like reference numerals, and descriptions will not be repeated.

In the fourth example embodiment, a rotation control device 35, or control unit, is constructed by a lock device having a construction different from that of the rotation control device 11 of the first example embodiment.

For example, the rotation control device 35 is constructed of a gear 36, a lock member 37, a bar-shaped member 38 and a motor 39. The gear 36 is attached to the rotation shaft 21 of the jog dial member 20. The lock member 37 has an end portion to be fitted to the gear 36. The bar-shaped member 38 is arranged to press the rotation shaft 21 toward the lock member 37. The bar-shaped member 38 is moved by the motor 39.

Specifically, the rotation shaft 21 is moved toward the lock member 37 by moving the bar-shaped member 38 toward the lock member 37 (in the upward direction in FIG. 10) by the motor 39 so that the end portion of the lock member 37 is fitted with the gear 36. Thus, the rotating movement of the jog dial member 20 is restricted.

To release the restriction of the rotating movement of the jog dial member 20, the bar-shaped member 38 is moved in the opposite direction by the motor 39 so that the rotation shaft 21 moves and separates from the end portion of the lock member 37. Structures of the fourth example embodiment except for the rotation control device 35 are the same as the constructions of the first example embodiment. Accordingly, advantageous effects substantially similar to those of the first example embodiment can be provided in the fourth example embodiment.

Figure 11:
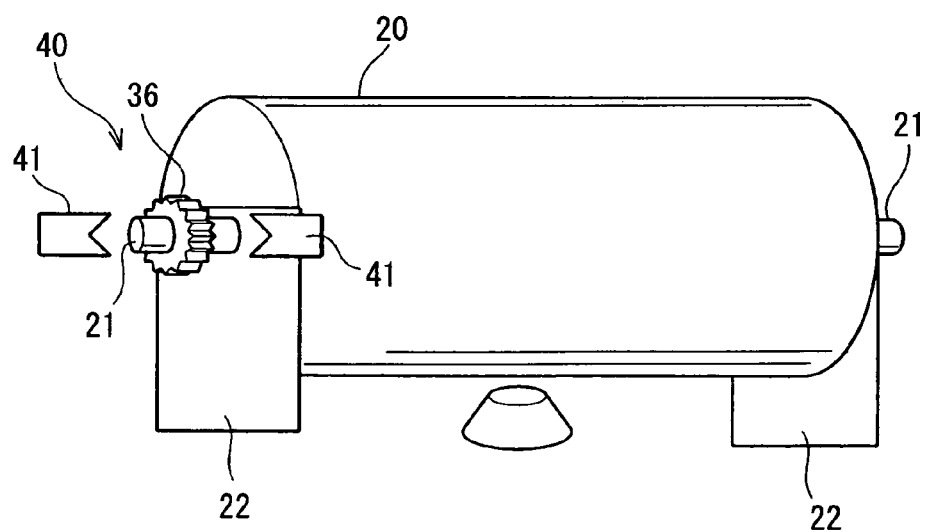
FIG. 11 is a schematic perspective view of a jog dial member and a rotation control device of a steering switch device according to a fifth example embodiment of the present invention.
Figure 12:
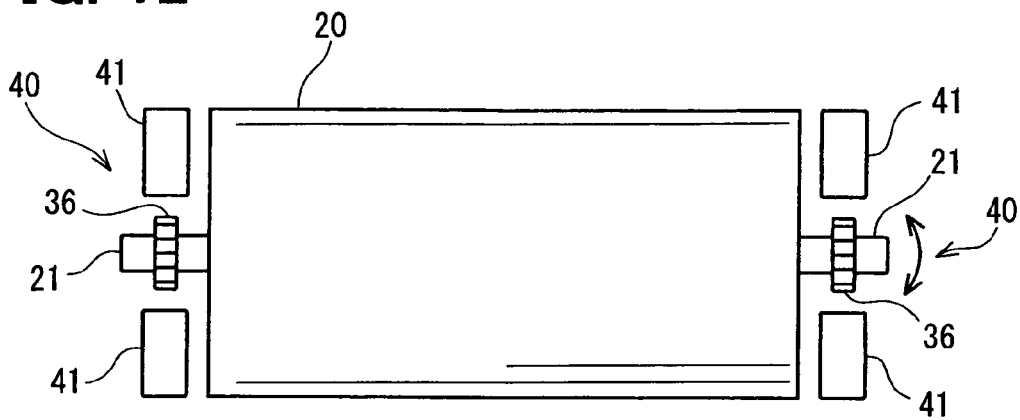
FIG. 12 is a side view of the jog dial member and the rotation control device in a condition that a rotating movement of the jog dial member is not restricted according to the fifth example embodiment.

Next, a fifth example embodiment of the present invention will be described with reference to FIGS. 11 to 13. Structural parts similar to those of the fourth example embodiment are designated by the like reference numerals, and descriptions will not be repeated.

In the fifth example embodiment, a rotation control device 40, or control unit, is constructed of a lock device having a construction different from that of the fourth example embodiment.

For example, the rotation control device 40 is constructed of gears 36 attached to the rotation shafts 21 of the jog dial member 20 and lock members 41. Two lock members 41 are arranged on both radial sides of each gear 36.

Figure 13:
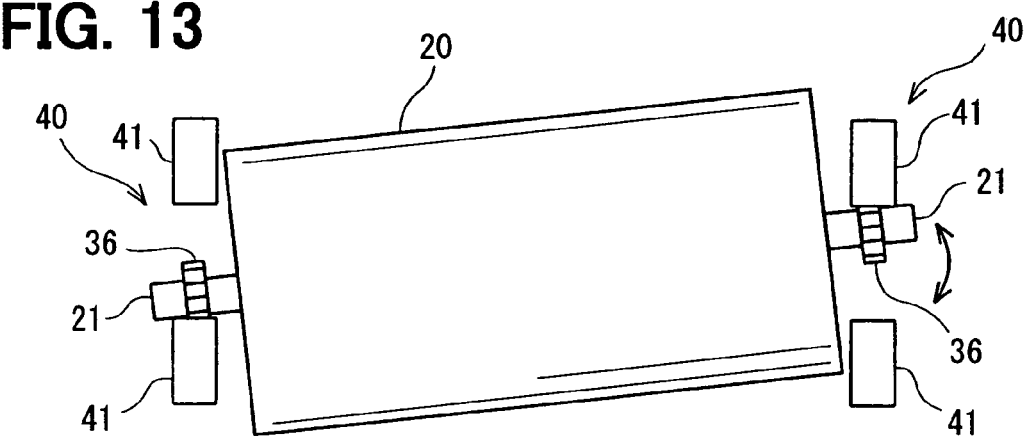
FIG. 13 is a side view of the jog dial member and the rotation control device in a condition that the rotating movement of the jog dial member is restricted according to the fifth example embodiment.

In this construction, when the steering wheel 13 is rotated and the jog dial 20 is inclined, as shown in FIG. 13, the gears 36 are engaged with the lock members 41. Thus, the rotating movement of the jog dial 20 is restricted. Structures of the fifth example embodiment except for the rotation control device 40 are the same as the structures of the fourth example embodiment. Accordingly, advantageous effects similar to those of the fourth example embodiment can be provided in the fifth example embodiments.

In the above second to fifth example embodiments and those modified embodiments, it can be constructed such that the pressing operation of the jog dial member 20 is available when the steering wheel 13 is rotated, similar to the first example embodiment. Namely, it is preferable to construct such that the jog dial member 20 can be pressed even when the steering wheel 13 is rotated.

As a structure to allow the pressing operation of the jog dial member 20, the rotation control device (resistance applying device) can be constructed to be movable with the jog-dial member 20 in a direction that the jog dial member 20 is pressed. Further, the structure to allow the pressing operation of the jog dial member 20 can be constructed by another way.

On the contrary, the jog dial member 20 can be constructed such that the pressing operation is not available when the steering wheel 13 is rotated. Namely, it is possible to construct such that the pressing operation of the jog dial member 20 is restricted. In this case, a device such as a pushing-operation restricting device for restricting the pushing-operation of the jog dial member 20 can be provided.

The pushing-operation restricting device can be constructed of the lock mechanism, the brake mechanism, and the repulsion force applying mechanism, similar to the rotating movement restricting devices 11, 26, 31, 35, 40 (also, see FIG. 16 of the later-described sixth example embodiment).

Next, the sixth example embodiment of the present invention will be described with reference to FIGS. 14 to 17. Structural parts similar to those of the first example embodiment are designated by the like reference numerals, and descriptions will not be repeated.

Figure 14:
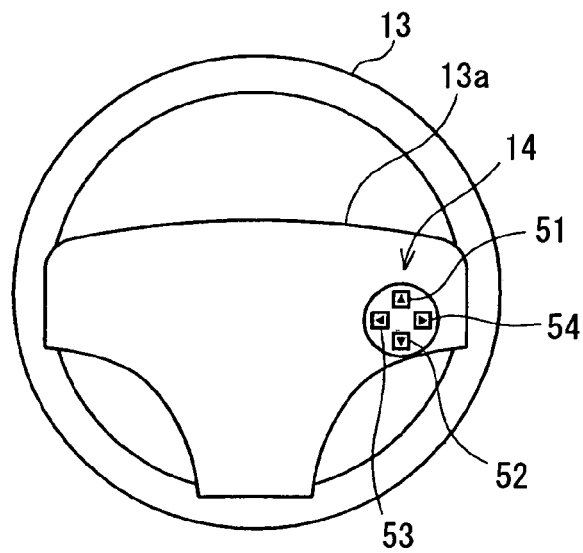
FIG. 14 is a front view of a steering wheel having a steering switch device according to a sixth embodiment of the present invention.
Figure 15:
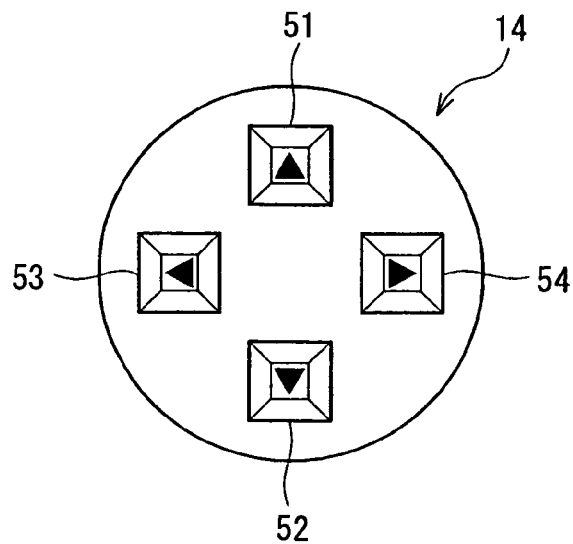
FIG. 15 is a front view of the steering switch device according to the sixth example embodiment.

In the sixth example embodiment, as shown in FIG. 14, four cursor keys 51, 52, 53, 54 are arranged on the steering wheel 13, instead of the jog dial member 20. The four cursor keys are constructed of an up cursor key 51, a down cursor key 52, a left cursor key 53 and a right cursor key 54. The four cursor keys 51, 52, 53, 54 serve as operation keys to give instructions (the respective instructions of up, down, left and right) relative to display directions in the display device 6.

Figure 16:
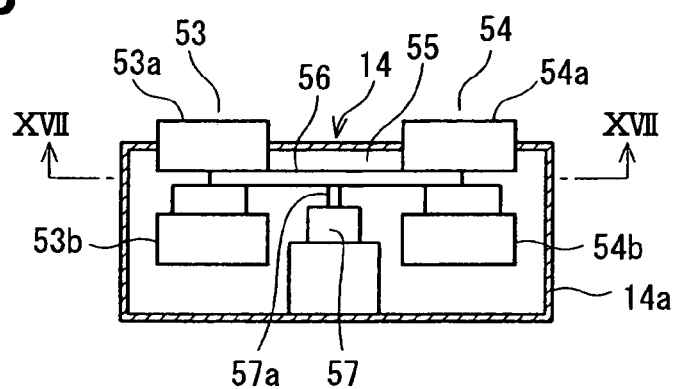
FIG. 16 is a schematic cross-sectional view of the steering switch device according to the sixth example embodiment.
Figure 17:
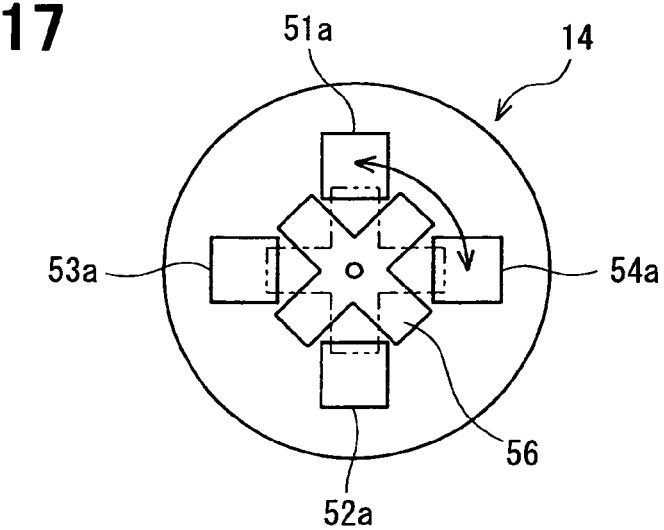
FIG. 17 is a schematic cross-sectional view of the steering switch device taken along a line XVII-XVII of FIG. 16 for explaining an operation of a button restricting plate.

As shown in FIGS. 16 and 17, the respective cursor keys 51, 52, 53, 54 are constructed of operation buttons 51a, 52a, 53a, 54a as operation members to be pressed down and switches 53b, 54b (only two switches are illustrated, for convenience of illustration). Each of the operation buttons 51a, 52a, 53a, 54a is arranged to be pressed down, i.e., movable (projected and retreated) with respect to a casing 14a of the steering switch device 14. The switches 53b, 54b are turned on and off by the operation buttons 51a, 52a, 53a, 54a.

Further, a pressing operation restricting device 55, or control unit, for restricting pressing operations of the operation buttons 51a, 52a, 53a, 54a is arranged on the rear sides of the operation buttons 51a, 52a, 53a, 54a (under the operation buttons 51a, 52a, 53a, 54a, in FIG. 16).

For example, the pressing operation restricting device 55 is constructed of a button restricting plate 56 and a motor 57 for rotating the button restricting plate 56. The button restricting plate 56 has a shape of cross, as shown in FIG. 17. The button restricting plate 56 is coupled to a rotation shaft 57a of the motor 57. The motor 57 has a sensor for detecting a rotating angle of the rotating shaft 57a (i.e., button restricting plate 56) therein.

The motor 57 is constructed such that the button restricting plate 56 is rotationally moved and stopped at a position shown by a solid line in FIG. 17 and a position shown by a double-dashed chain line in FIG. 17. When the button restricting plate 56 is at the position shown by the solid line in FIG. 17, the operation buttons 51a, 52a, 53a, 54a are operable. When the button restricting plate 56 is at the position shown by the double-dashed chain line in FIG. 17, pressing operations of the operation buttons 51a, 52a, 53a, 54a are restricted.

In this construction, the button restricting plate 56 is located at the position shown by the solid line in FIG. 17 in the normal time. As such, the pressing operations of the operation buttons 51a, 52a, 53a, 54a can be available. When it is detected that the steering wheel 13 is rotated, the button restricting plate 56 is rotated to and stopped at the position shown by the double-dashed chain line by the motor 57. As such, the pressing operations of the operation buttons 51a, 52a, 53a, 54a are restricted.

Structures of the sixth example embodiment except for the above described structures are the same as the structures of the first example embodiment. Accordingly, advantageous effects similar to those of the first example embodiment can be also provided in the sixth example embodiment.

Here, it is not always necessary that the operation buttons 51a, 52a, 53a, 54a are separately provided. Namely, the operation buttons 51a, 52a, 53a, 54a can be formed by a single plate-like member having a shape of cross, for example. Also, the number of the cursor keys is not limited to four.

In addition to the structure of the sixth example embodiment, the jog dial member 20 can be provided in the steering switch device 14. Next, a structure of the steering switch device 14 having the four cursor keys 51, 52, 53, 54 and the jog dial member 20 will be described with reference to FIG. 18, as a seventh example embodiment of the present invention.

Figure 18:
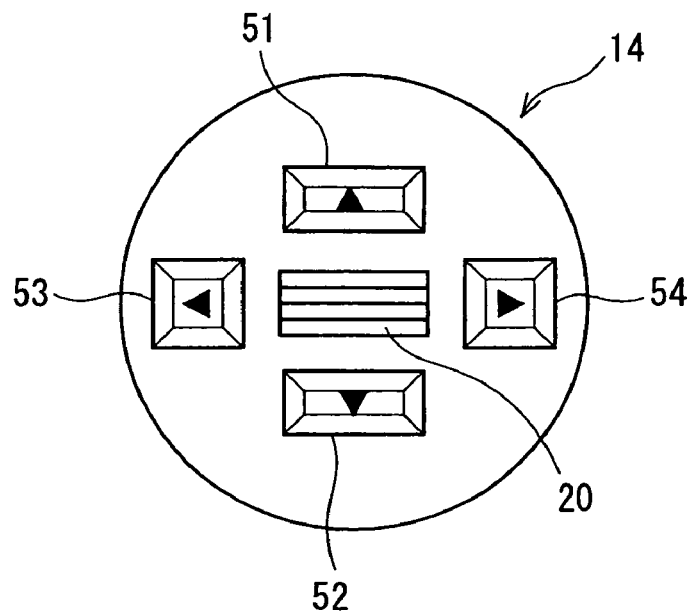
FIG. 18 is a front view of a steering switch device according to a seventh example embodiment of the present invention.

As shown in FIG. 18, the jog dial member 20 is arranged in a middle position of the four cursor keys 51, 52, 53, 54. The jog dial member 20 is arranged to be rotationally operated and pressed, similar to the first example embodiment.

Further, when the steering wheel 13 is rotated from the basic position, it is constructed such that the rotating operation of the jog dial member 20 is restricted and the pressing operations of the four operation buttons 51a, 52a, 53a, 54a are also restricted. Namely, the four cursor keys 51, 52, 53, 54 can be constructed in a manner similar to that of the sixth example embodiment. The jog dial member 20 can be constructed in a manner similar to that of the first example embodiment.

Structures of the seventh example embodiment except for the above structure are substantially the same as the structures of the first and sixth example embodiments. Accordingly, advantageous effects similar to those of the first and sixth example embodiments are provided in the seventh example embodiment.

Alternatively, the jog dial member 20 can be constructed in a manner of the second to the fifth example embodiments. That is, the rotation control devices of the second to the fifth example embodiments can be employed to the structure of the seventh example embodiment.

In the above sixth and seventh example embodiments, it is constructed such that the pressing operations of the four cursor keys 51, 52, 53, 54 are restricted when the steering wheel 13 is rotated. Alternatively, it may be also constructed such that it is difficult to press the four cursor keys 51, 52, 53, 54 when the steering wheel 13 is rotated.

In this case, a pressing operation control device to load the pressing operation of the cursor keys 51, 52, 53, 54 so that it is difficult to press the cursor leys can be considered. For example, a device for adjusting strokes of the pressing operations of the operation buttons 51a, 52a, 53a, 54a so as to be increased is considered, as one example of the pressing operation control device. To change, i.e., increase or decrease, the stroke of the operation buttons 51a, 52a, 53a, 54a, a cam can be arranged between the operation buttons 51a, 52a, 53a, 54a and the switches 53b, 54b. Alternatively, the switches 53b, 54b can be constructed to move with respect to the operation buttons 51a, 52a, 53a, 54a.

Further, a device for adjusting the pressing operations of the operation buttons 51a, 52a, 53a, 54a to be loaded is considered as another example of the pressing operation control device. To load the pressing operations of the operation buttons 51a, 52a, 53a, 54a, a device for adjusting, i.e., increasing and decreasing the spring force of a spring that supports an operation knob of each of the switches 53b, 54b may be suitably added.

When the steering wheel 13 is rotated, the pressing operations of the operation buttons 51a, 52a, 53a, 54a are made difficult. Accordingly, it is difficult for the user to push the operation buttons 51a, 52a, 53a, 54a when the steering wheel 13 is rotated. Therefore, it is less likely that the user will feel physical disorder to operate the operation buttons 51a, 52a, 53a, 54a on the rotated or inclined steering wheel 13, and operability will be reduced.

In the above example embodiments and modifications thereof, the jog dial member 20 and the operation buttons 51a, 52a, 53a, 54a are directly arranged in the steering wheel 13. That is, the steering switch device 14 is previously and directly mounted to the steering wheel 13. Instead of this construction, the jog dial 20 and the operation buttons 51a, 52a, 53a, 54a may be also constructed so as to be mounted to the steering wheel 13 in a later attaching system, as an eighth example embodiment.

Figure 19:
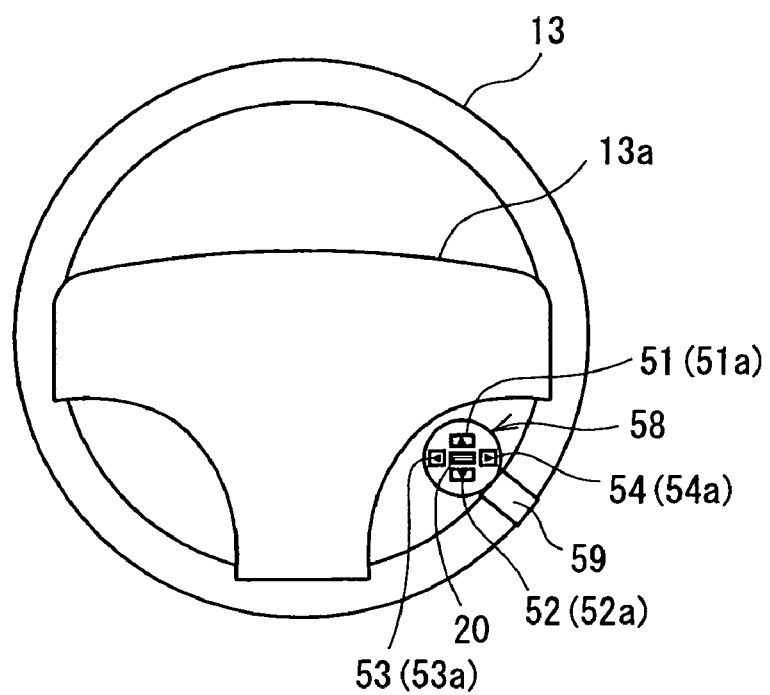
FIG. 19 is a front view of a steering wheel having a steering switch device according to an eighth example embodiment of the present invention.

In this case, as shown in FIG. 19, a steering switch device 58 of a remote control type is fixed to the steering wheel 13 through an attaching jig 59 such as by a belt and/or a metal fitting. The steering switch device 58 is for example provided with the jog dial member 20 and the operation buttons 51a, 52a, 53a, 54a (i.e., cursor keys 51, 52, 53, 54)

In this construction, a sensor for detecting the rotating angle of the steering wheel 13 is arranged within the steering switch device 58, and the rotating movement restricting devices 11, 26, 31, 35, 40, 41, the rotating movement resistance applying device, the pressing restricting device 55, the pressing operation control device and the like described in the above example embodiments and the modifications thereof may be suitably arranged in accordance with necessity.

In the above example embodiments, the jog dial member 20 is arranged such that its rotation axis extends in the horizontal direction in a condition that the steering wheel 13 is at the basic position. However, the jog dial member 20 can be arranged such that its rotation axis extends in the vertical direction. In this case, the jog dial member 20 serves as the left cursor key and the right cursor key for giving directional instruction relative to the information displayed on the display device 6. Thus, the rotating movement of the jog dial member 20 is restricted or loaded when the rotation axis of the jog dial member 20 is inclined with respect to a reference direction (e.g., horizontal direction) of the information displayed on the display device 6 due to the rotation of the steering wheel 13.

Further, use of the steering switch device 14 is not limited to the input device for the car navigation system 1. For example, the jog dial member 20 and the operation buttons 51, 52, 53, 54 can be operated to provide operation instruction to an apparatus such as an air conditioning system or audio system.

The example embodiments of the present invention are described above. However, the present invention is not limited to the above example embodiments, but may be implemented in other ways without departing from the spirit of the invention.

What is claimed is:

1. A steering switch device for a vehicle, comprising:
   an operation member mounted to a steering wheel of the vehicle, the operation member having a cylindrical shape and disposed to be operated in a rotational manner; and
   a control unit disposed to control a rotating movement of the operation member when the steering wheel is rotated.

2. The steering switch device according to claim 1, wherein the control unit has a mechanism that restricts the rotating movement of the operation member when the steering wheel is rotated.

3. The steering switch device according to claim 2, wherein the mechanism is composed of a locking mechanism that locks the rotating movement of the operation member.

4. The steering switch device according to claim 2, wherein the mechanism is composed of a brake mechanism that produces a frictional force relative to the rotating movement of the operation member.

5. The steering switch device according to claim 2, wherein the mechanism is composed of a repulsion force applying mechanism that produces a repulsion force against the rotating movement of the operation member.

6. The steering switch device according to claim 1, wherein the operation member is adapted to be operated by pressing, and the control unit is disposed such that pressing of the operation member is restricted when the steering wheel is rotated.

7. The steering switch device according to claim 1, wherein the operation member is adapted to be operated by pressing, and the control unit is disposed such that pressing of the operation member is allowed when the steering wheel is rotated.

8. The steering switch device according to claim 1, wherein the control unit has a mechanism that applies a load on the operation member such that resistance to the rotating movement of the operation member is increased when the steering wheel is rotated.

9. The steering switch device according to claim 8, wherein the mechanism is composed of a brake mechanism that applies a frictional force to the operation member.

10. The steering switch device according to claim 8, wherein the mechanism is composed of a repulsion force applying mechanism that applies a repulsion force against the rotating movement of the operation member.

11. The steering switch device according to claim 1, wherein the operation member is operated to provide an instruction relative to information displayed on a display section arranged in a meter device of the vehicle.

12. The steering switch device according to claim 1, wherein the operation member is attached to the steering wheel by an attachment device.

13. A steering switch device to be mounted on a steering wheel of a vehicle, the vehicle having a display section on which information is displayed, the display section having a reference direction, the steering switch device comprising:
   an operation member disposed on the steering wheel to be operable in at least one of a pressing manner and a rotation manner to provide an instruction with respect to information displayed on the display section, the operation member having a reference direction that is parallel to the reference direction of the display section in a condition that the steering wheel is at a basic position; and
   a control unit disposed to control an operation condition of the operation member, wherein the control unit controls the operation condition of the operation member when the reference direction of the operation member is inclined more than a predetermined angle with respect to the reference direction of the display section due to a rotating operation of the steering wheel.

14. The steering switch device according to claim 13, wherein the operation member includes at least one jog dial member and a pressing button.

15. The steering switch device according to claim 13, wherein the display section is arranged in a meter device of the vehicle to display information for a navigation system.

16. A steering switch device for a vehicle comprising:
   an operation member mounted to a steering wheel of the vehicle, wherein the operation member is capable of being operated in a predetermined direction; and
   a control unit that controls an operation of the operation member when the steering wheel is rotated.

* * * * *